(12) United States Patent
Valachovic

(10) Patent No.: US 6,502,629 B2
(45) Date of Patent: Jan. 7, 2003

(54) PAINT BOOTH TEMPERATURE CONTROL SYSTEM

(76) Inventor: Robert Valachovic, 2515 Englewood Ave., Schenectady, NY (US) 12309

(*) Notice: Subject to any disclaimer, the term of this patent is extended or adjusted under 35 U.S.C. 154(b) by 0 days.

(21) Appl. No.: 09/768,952

(22) Filed: Jan. 24, 2001

(65) Prior Publication Data

US 2002/0096319 A1 Jul. 25, 2002

(51) Int. Cl.[7] .................................. F25B 29/00
(52) U.S. Cl. .................... 165/263; 165/48.1; 62/176.6
(58) Field of Search .................. 165/263, 264, 165/48.1; 236/44 R, 44 C; 62/90, 91, 159, 176.6

(56) References Cited

U.S. PATENT DOCUMENTS

| | | | |
|---|---|---|---|
| 3,165,146 A | * | 1/1965 | Smith et al. .............. 165/263 |
| 3,165,147 A | * | 1/1965 | Roof et al. ............. 165/263 X |
| 3,224,499 A | * | 12/1965 | Reinecke .................... 165/263 |
| 3,590,910 A | * | 7/1971 | Lorenz ................. 165/263 X |
| 3,623,543 A | * | 11/1971 | Ostrander ............. 165/263 X |
| 3,786,859 A | * | 1/1974 | Day ..................... 165/263 X |
| 3,807,291 A | * | 4/1974 | Roberts et al. |
| 3,979,535 A | | 9/1976 | Govindan |
| 4,173,924 A | * | 11/1979 | Bradshaw |
| 4,284,236 A | * | 8/1981 | Bradshaw |
| 4,367,787 A | | 1/1983 | Bradshaw |
| 4,386,733 A | * | 6/1983 | Bradshaw |
| 4,537,120 A | * | 8/1985 | Josefsson |
| 4,542,851 A | * | 9/1985 | Itou |
| 4,549,472 A | * | 10/1985 | Endo et al. |
| 4,616,594 A | | 10/1986 | Itho |
| 5,127,574 A | | 7/1992 | Mosser et al. |
| 5,213,259 A | | 5/1993 | Stouffer |
| 5,247,989 A | * | 9/1993 | Benevelli .................... 165/263 |
| 5,408,838 A | * | 4/1995 | Yaeger et al. |
| 5,922,130 A | * | 7/1999 | Mosser et al. |
| 5,970,625 A | * | 10/1999 | Scheufler et al. |

OTHER PUBLICATIONS

"SprayKleen" spray booth brochure by SAIMA Spa (Italy) from PIPPA Industries, Inc.; Patterson, NJ.

* cited by examiner

Primary Examiner—Ljiljana Ciric
(74) Attorney, Agent, or Firm—Fredric T. Morelle

(57) ABSTRACT

Algorithmically linked ("ganged"), multiple air conditioners in a paint booth temperature control system effecting a continuous running of at least one conditioner during an operational demand phase, or cycle, of the booth. All of the air conditioners have an independent temperature sensor that is placed at a discrete location in the air stream so that between the sensor physical placements there is effectively established a differential that is applied by the automatic control system to maintain a comfortable difference between the booth coolest and warmest work environments.

3 Claims, 3 Drawing Sheets

PAINT BOOTH TEMPERATURE CONTROL SYSTEM

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to conditioning the forced air of downdraft types of paint booths that are used in the automotive repair industry. Particularly, it relates to an improvement in management, conditioning and control of the air flow in order to improve and maintain comfortable working and breathing environment, thereby ensuring a better level of health and safety for painting personnel. Specific to the invention is the concept of emulating operation of a large-capacity cooling system with multiple smaller air conditioners.

2. Discussion of Relevant Art

Those associated with modern automotive body repair facilities are acquainted with Occupational Health and Safety Act (OSHA) requirements as they pertain to the work environment that must be maintained in the facilities used for painting. Foremost among the health and safety standards are those that deal with the handling, use and disposal of noxious paint and solvent fumes. To this end, there is extensive use of air moving and air conditioning equipment, including that for ventilation as well as humidifying, and heating or cooling the air for paint curing. Most paint facilities consist in rooms or booths that are spacious enough to enclose the object to be painted, while affording adequate space for one or two persons, with spray equipment, to move comfortably about the particular facility. In high production facilities, wherein the two cycles—painting and curing—are run throughout the workday, a cool down problem may occur in most locations in the temperate weather zone. This problem occurs primarily because the curing heat required in the facility (hereafter, "booth") is not ameliorated rapidly enough to allow comfortable reentry by the painter(s). Ambient humidity and temperature, at the beginning of the day, are readily handled by most systems, during the incipient operation, but not as the day progresses. Consequently, personnel are often subjected to arduous working conditions which, on days of high temperature and/or humidity, create an issue of health and safety.

In this discussion of relevant art, I want to first describe the type of facility that I originally purchased and have subjected to the hereinafter discussed improvements. My booth is a product of S.A.I.M.A.; Arezzo, Italy, imported by Pippa Industries, Paterson, N.J. The equipment provision for this drive-in enclosure is, in the sequence of principal air flow: intake; air ducting; adjacent damper (not in the direct intake air stream); air mover; furnace; a ducting subsystem that communicates with both the intake stream (via an adjacent damper) and the booth ceiling (via a plenum); ceiling filtration; booth enclosure; floor filtration; and an exhaust duct, leading to ambient atmosphere. [There was no air conditioner provided in the original booth.]

During the "baking" or curing cycle, the personnel are evacuated and, by use of the control system, the furnace is activated for high(er) heat and the damper is positioned to partially re-circulate the heated air into the intake stream. Re-circulation of the heated air induces a rapid heat rise to acquire a metal temperature (of the vehicle) of 140° F. (60° C.). Immediately after the curing cycle, the air flow is restored and the damper is repositioned to reinitiate the "paint" cycle. In the original, unimproved system, booth cool down, from about 100° F. to about 75°, took an average of nine minutes or more, depending on outside temperature. During the paint spraying operation, a single air conditioner ("A/C"), that I retrofitted to the original booth, cycled an average of every four minutes, with temperature varying as much as 18° F. On the second painting cycle of the day, recovery to tolerable conditions for personnel was acceptable (about eight minutes). However, as the day progressed, and both ambient outside and equipment temperatures rose, the recovery time became protracted (to as long as, or longer than 20 minutes). Often, on humid days over 85° F., the air conditioning unit failed to recover sufficiently, requiring a shut down in operations and posing, for me, the most significant deficiency in my operation.

I cannot say how other systems, made by other manufacturers, perform; however, a relevant art search has shown the equipment and techniques employed by them and prompted me to disclose my recent improvements.

The systems of interest are downdraft types that essentially provide air through the overhead structure and exhaust through the floor on which the work piece resides. U.S. Pat. No. 5,213,259, issued for Paint Booth Humidity and Temperature Control System, is directed toward a humidity control system that uses a water spray nozzle to rapidly alter the humidity and, consequently, the temperature of air taken into a paint booth through its ceiling. The air is drawn across the work piece, front to rear, and exhausted through the same ceiling. Being of a substantially different draft type than required by my operation, this system is noted only in that no provisions appear to have been made for balancing personnel comfort against high productivity requirements. In U.S. Pat. No. 5,127,574, issued for Spray Booth for Applying Coatings to a Substrate and Control Device Therefore (sic), shows a down draft type paint system that uses an open booth, similar to a laboratory hood, save for the downward flow. It displays only a spraying apparatus and, absent a heat curing setup, is not fully within the purview of my invention. U.S. Pat. No. 3,979,535, issued for Process for the Spray Application of Aqueous Paints by Controlling the temperature of the Air in the Paint Spray Zone is relevant in that it discloses a system for modifying spray air during the painting cycle. This technique is inapplicable to the treatment of booth air, in general; it is cited because it discusses the relationship that environmental humidity bears to ambient temperature and the coating (painting) process.

Two patents having similar tangential relevance, in that working persons are not of particular concern nor employed, are U.S. Pat. Nos. 4,367,787 and 4,616,594, issued for Air Conditioning Apparatus and Method for Paint Spray Booths and Painting Booth, respectively. The first of these consists in a single air conditioner system that uses a multiply-sectioned heat exchanger and partitioned air flow treatment to effectively recover and conserve energy while providing a customized mix of conditioned and unconditioned (bypassed) air to a paint booth (not disclosed). The second employs a single air conditioner, but is concerned only with providing temperature and humidity controlled air to an unmanned or robotic system, and within a very small zone. Of particular interest to me is its similarity to my present system, but for lack of a human element and the sparseness of the area of work.

A most notable deficiency with single, large-capacity air conditioners is that, with the requirement to maintain tolerable work conditions (by keeping the temperature environment within a few degrees), the cooling system must turn on/off frequently. This characteristic is deleterious to all machinery, irrespective of size.

INCORPORATION BY REFERENCE

In the aggregate, U.S. Pat. Nos. 4,616,594, 5,127,574 and 5,213,259 show many of the aspects of the original paint booth facility that I have improved for human comfort and safety, e.g., downdraft type, ceiling and floor filtration, at most a single air conditioner or partial re-circulation. All are hereinafter incorporated by reference.

DEFINITIONS

Terms used herein shall have their standard meanings which are taken ordinarily from the American Heritage Dictionary of the English Language 2000. In the case of a word or term to which is ascribed a particular meaning of art, the word will be used in context, defined, and setoff by quotation marks (")

BRIEF SUMMARY OF THE INVENTION

I have succeeded in improving the health and safety conditions of personnel that work in my paint spraying facilities, without suffering any measurable loss of product or profit, while still avoiding the high on/off cycling rate of the principal cooling facility. Where I have invested to purchase equipment, I have gained by decreasing inoperative situations or periods ("down time"), thus increasing production and concurrently ensuring a greater degree of comfort for my workers.

The most notable factor in modem, manned spray booths, that leads to excessive down times, is the variation in booth circulating air temperature, exacerbated by multiple, prior baking/curing operations. Recovery times of 20–30 minutes, for booth cool down from 100° F. to 75°, combined with booth air temperature variation of up to 18 degrees, from the desired "base" temperature of 70° F., are common. The air conditioner ("A/C") will run ("cycle") every 3–5 minutes and, quite often, shut down completely due to overheating; its recovery time being dependent on outside ambient air temperature and the difference ("$\Delta T$" or "setoff") between the set maximum/minimum temperatures at which the single A/C turns on/off.

In order to cure the above-mentioned deficiency, I have devised a method of utilizing more than one A/C (two are suitable to my particular needs), that are each responsive to an independent and discretely placed temperature sensor, and have regulated the operation of this multiplicity of A/Cs to ensure that at least one will run (i.e., continual cooling rather than dependently cycling over a setoff range, ibid.) during the paint spraying cycle, when outside temperatures exceed my desired base temperature (ibid.). To achieve this, I have placed my dual A/C temperature sensors in a stylized arrangement that allows the emulation of a (preset) setoff, as used in the solitary A/C plant. In essence, I acquire a $\Delta T$ by locating, with ordinary thermometers, physically separated positions in the booth plenum wherein the desired temperature difference of $\pm 3°$ may be observed. The first sensor placement is close to the point of air introduction to the plenum; the second is toward the most distant (or "distal") part of the plenum, sufficient to acquire a $\Delta T$ of about six degrees ($\pm 3°$). Each A/C is configured to operate at the preset temperature, having an inherent setoff of $\pm 0.5°$, the first responding to its sensor at a nominal 67° F. (turn on/off at 67.5°/66.5°) and the second, a nominal 73° F. (turn on/off at 73.5°/72.5°). Thus, between the respective low and high points, the desired base of 70° F.$\pm 3°$ is attained by the multiple air conditioner system, emulating a single one; and, so long as ambient temperatures exceed 70°, at least one A/C is compelled to run by the controller, monitoring the sequencing of the A/Cs. Where cost is not necessarily an object, more than one controller may be used to set individual temperature ranges for the sensors, thus acquiring smaller or greater variations.

All A/Cs shut down at commencement of the baking/curing cycle, when personnel have exited the booth and re-circulation of booth air is initiated. The baking cycle normally lasts up to 45–50 minutes, during which the air temperature rises to 180° F., heating both the work piece and the booth interior to at least 140° F.

When the instant improvements to the system are properly installed/operated, the results are remarkable: single A/C cycling time or outside air temperature is no longer a concern; booth circulating air temperature varies by plus or minus three degrees ($\pm 3°$); and, operational recovery times are reduced to an average of four minutes, throughout the work day.

DETAILED DESCRIPTION OF THE INVENTION

Figure 1:
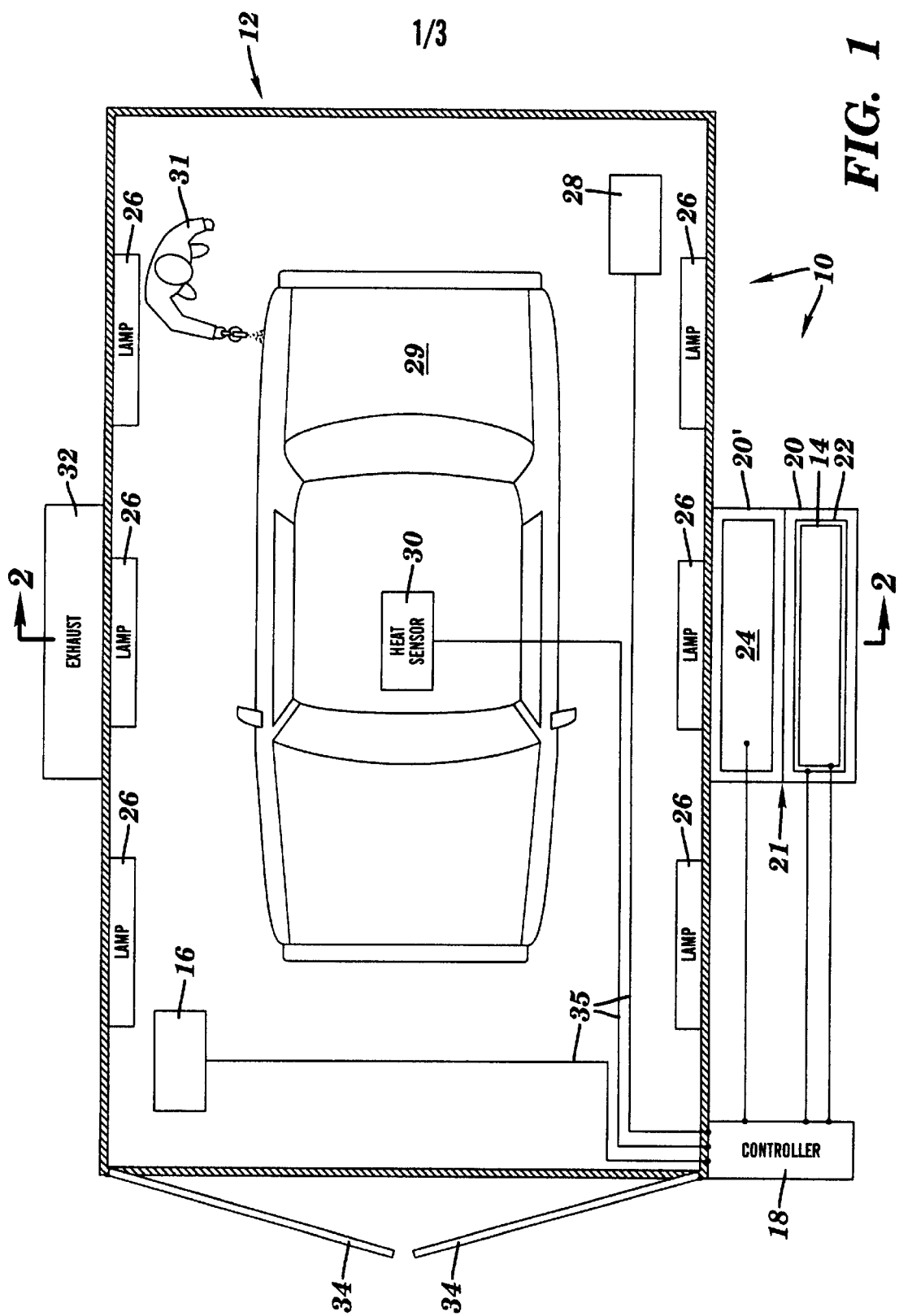
FIG. 1 is a schematic illustration of the booth, to which the instant improvements are made, in a plan view, with ceiling removed (approx. scale)

Before disclosing my invention in detail, I wish to point out that I have made this invention having no personal electrical or air conditioning skills. The installation of additional equipment, all off-the-shelf, was made according to my directions by workers skilled in the pertinent art area. Sensing devices were set, at the controller, to specifications that would acquire the performances desired, as dictated by my concepts. Equipment, not essential to the disclosure of the invention, is not shown in the drawings nor discussed after any length. Therefore, the reader will not find this (commercially available) booth depicted with exactitude.
Physical Plant Referring now to FIG. 1, my improvements ("invention") 10 are depicted in plan view of the painting-curing booth 12 and consist in: an A/C cooling coil 14; its discrete temperature sensor 16; and control electronics (unseen), placed in the controller 18. More than one A/C and sensor may be used, depending on a more detailed cost analysis than I was willing to make. As mentioned in the SUMMARY, above, and later in this preferred embodiment description, the reduction of booth recovery time and booth re-circulating air temperature differential by more than 80% met my needs.

Continuing, at the bottom of FIG. 1, and moving upward, the particulars of (my) first modified booth are: air intake (down draft) duct 20; duct partition 21; the first-installed A/C cooling coil 22; furnace 24; wall-mounted lamps 26;

first-installed temperature sensor 28; heat sensor 30; doors 34 and, exhaust (up draft) duct 32. The work piece 29 and painter 31 are depicted to give the reader an appreciation of the close confines within the booth, which is dimensioned approximately 24'(1)×14'(w)×11'(h). Wiring 35 is not necessarily depicted exactly as installed; however, placement of sensor 16 is correct in that it is diagonally placed across from sensor 28 (placed proximate air stream introduction).

Figure 2:
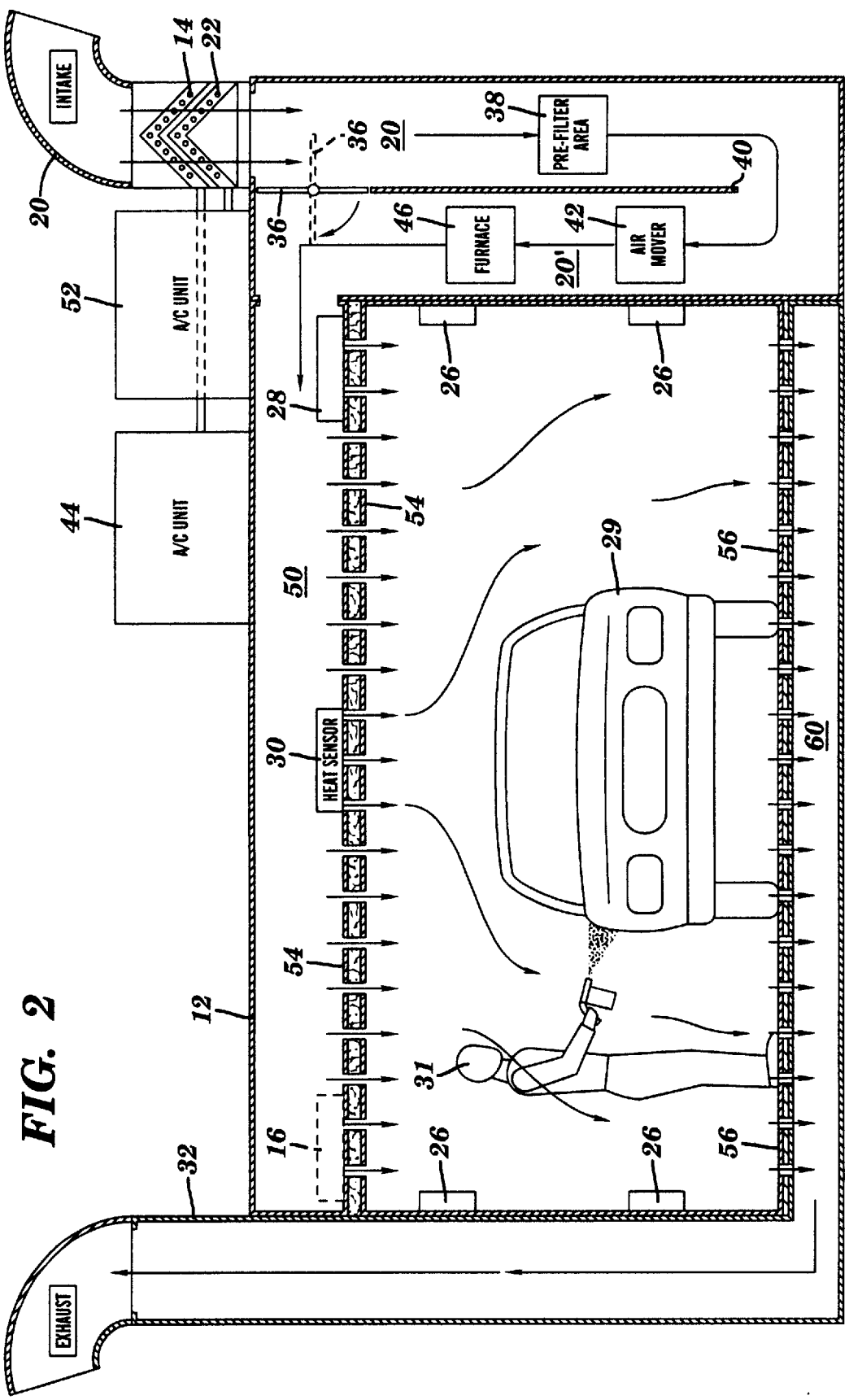
FIG. 2 is a schematic cross-sectional elevation of the FIG. 1 booth taken at 2—2 and showing placement of the instant improvements (approximate scale)

Having reference to FIG. 2, and along the path of air flow (long and arcuate-shafted arrows) there are depicted: intake duct 20 (descending); added coil 14, connected to A/C unit 44; cooling coil 22 and it's A/C 52; and, re-circulation control damper 36, positioned for the painting cycle, and depicted in phantom (dashed lines) to show the position during the baking/curing cycle. Next, in the direction of air flow, are seen the pre-filter area 38 consisting of fine-particle filters (not shown); duct partition 40, running from the damper to about 1.5'–2.0' above the floor; air mover 42, at the beginning of the rising portion 20' of the intake duct; a furnace 46; and, the ceiling plenum 50. The heat sensor 30 operates only during the curing cycle, which will be described after the physical plant; likewise, placement and operation of the temperature (A/C) sensors 28,16 will be addressed. Exiting the plenum 50, through the filtering ceiling 54, the air mass moves downward through the booth and out the filtering floor 56 to the exhaust plenum 60; thereafter it is exhausted through duct 32.

Figure 3:
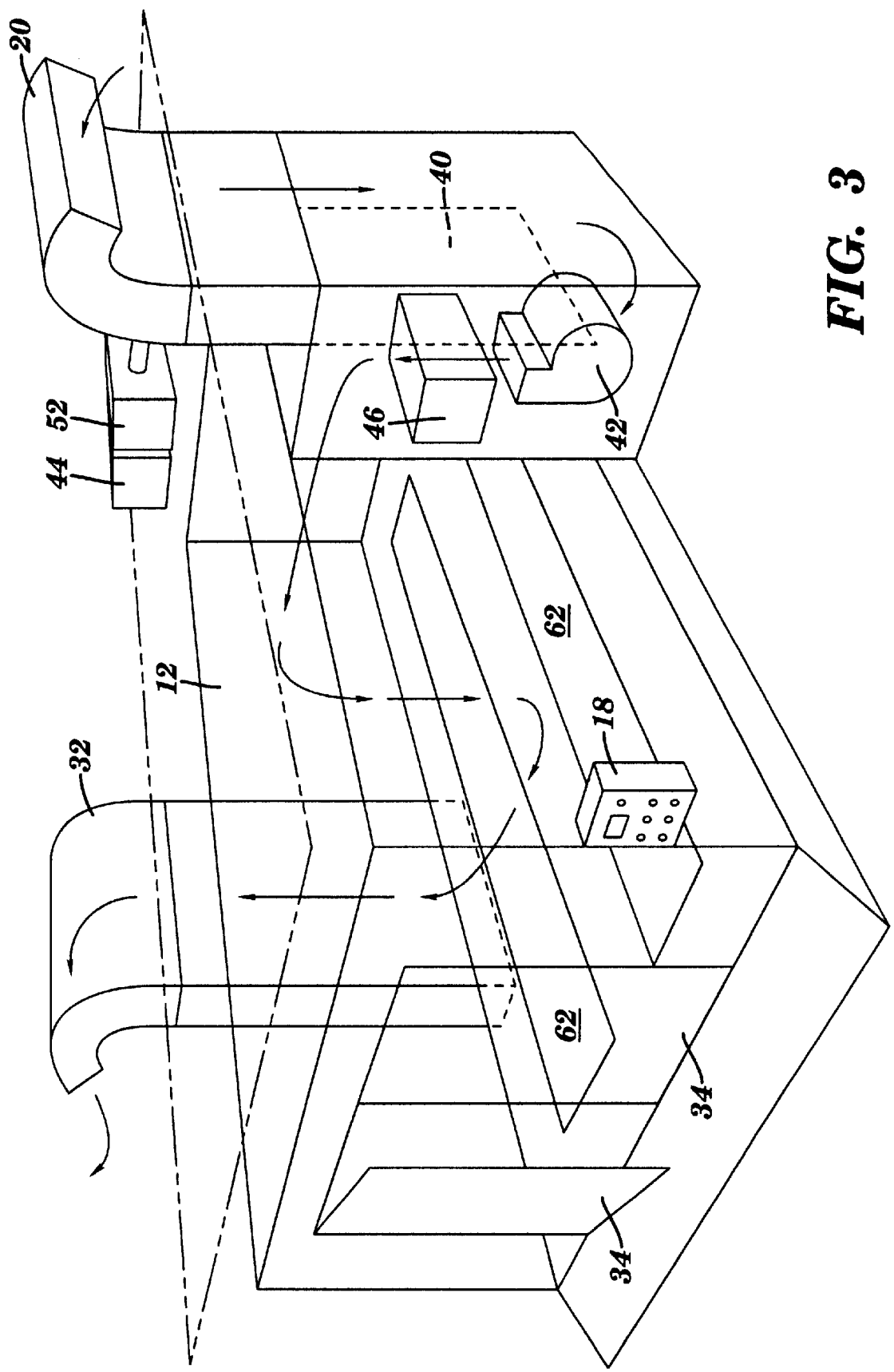
FIG. 3 is a perspective drawing of the booth, principal subsystems and improvements.

FIG. 3 is presented to give the reader a perspective on the physical plant. It shows the A/Cs 44,52 on the facility roof, but they can readily be placed anywhere that affords a better air conditioning economy. Air flow, as shown in FIGS. 1 and 2, is depicted by the curved arrows. Vehicle treadles 62 are seen only in FIG. 3 and their underlying physical structure, as well as floor supports have been omitted for the sake of clarity.

Methodology

The booth is operated in two cycles: in one, the painting or coating cycle, the A/Cs and heater operate to cool and moderate (heat) incoming air, the damper 36 is closed to assure that all air is directed down the intake duct, through the air mover 42 and through the ceiling to the booth; in the other, the baking/curing cycle, the A/Cs are shut down, the damper is moved to an essentially horizontal position, so that a portion of air destined (in the paint cycle) to enter the ceiling plenum 50 is now diverted to the intake air stream and re-circulated within the descending and rising sections 20,20' of the intake ducting and through the furnace 46. The furnace is a 1.2 Mbtu-capable burner and rapidly heats the re-circulating air to as high as 180° F. above the incoming air. The remaining portion of the air (not being re-circulated) is sent to the plenum 50 and serves to heat the booth interior. After the bake cycle is complete, cooling air is restored, the furnace heating reduced, as necessary, and the damper closed. The booth is prepared for beginning the next painting cycle. In my "original" (modified with one A/C setup, the sole A/C was often insufficient to recover and restore the booth to comfortable. operational status.

The process for which the physical improvements were installed is, in a more practical sense, a "balancing" apportionment of work load to the plurality of A/Cs. When it was first determined that a five to six degree variation in circulating air was the most that could be tolerated, I reasoned that more than one A/C, rather than a larger, was needed. The A/Cs must be electrically linked ("gated") to assure that one would always be operating during spraying, i.e., the painting cycle; but, if it should fail or shut down, a resting unit starts immediately. The problem observed with attempting to use a single larger A/C does not immediately become apparent, because those of ordinary skill and most workers are only familiar with office/shop work area and home A/Cs. In these more familiar situations, the A/Cs are large enough to operate without overloading, while cycling on/off between the desired minimum and maximum temperatures ("setoff"). This setoff is usually about two to four degrees (practically that of my booth, during painting). But, in the home or workplace, the environs are not cyclically heated to 180° F., whereby maintenance of small setoffs rapidly overworks a single A/C—regardless of its size. Aside from the control unit 18 adaptations, provided by a local serviceman, I saw the opportunity to modify the physical plant so as to take advantage of the temperature variation that occurs inherently in the plenum over and into the booth. By placing the sensors 16,28, et al. distant and opposite ("diametrical") from each other, on the ceiling 54, a difference in temperature of three to eight degrees is observed. The electrical controller then sequences ("switches" on and off) the air conditioners, resolving or balancing the plenum/booth differential (difference in temperature, ibid.), the individual sensor preset temperatures and my comfort requisites, to maintain the desired booth air temperature and variation. This physical arrangement of the plant, controlled optimally by the algorithmic routine operating on the inherent temperature differential, provides a most economical system for the modest automobile body repair service. Thus this is all achieved, not by installing a large-capacity system, but by emulating one with multiple smaller, less expensive ones. Under working conditions in my locale, I am able to achieve and maintain the desired temperatures for painting using only two A/Cs; and, by varying the placement of sensors and their settings, gate and sequence the operation of these A/Cs in the algorithmic manner desired: (one on-one off) OR (both on) to achieve my objectives. During the baking cycle, the system retains its originally designed routine and the A/Cs all shut down, the damper is opened, ambient air (untreated) is drawn in and the furnace is fired. Because one A/C is constantly operating during the spraying "demand" phase (booth temperature over 70° and ambient temperatures over 75°), humidity is maintained well within the comfort zone.

The physical plant and process of operation that I have presented herein is one that may be modified by those skilled in heating and cooling arts, provided that they acquire or are taught more than the rudiments of coating and curing automotive paints. My experience has been that, insofar as paint booth operation is concerned, normative heating and cooling techniques do not give the effects necessary to accomplish the work efficiently, safely and economically. However, economical and safer operation of the physical plant may be significantly increased by use of two or more A/Cs, a thoughtful placement of sensors and when set up and practiced (controlled) as disclosed herein.

The invention is commended to the field, consistent with the appended claims.

What is claimed is:

1. An air conditioning system of multiple air conditioners for achieving a desired temperature and maintaining it within a specified variation, in an air stream passing through a confined painting space, each of said multiple air conditioners supportive of a cooling coil set placed within the air stream, and comprising:

a heater;

a first of the multiple air conditioners, responsive to a first sensor that is situated in the air stream proximate the air stream's introduction to a ceiling plenum that services the booth, said first sensor adapted to sense a first temperature;

another of the multiple air conditioners, responsive to another sensor that is situated in the air stream distal the first sensor and adapted to sense a second temperature, thereby establishing a temperature differential with respect to the first temperature; and at least one control means for electrically switching and sequencing the heater and the multiple air conditioners and for assuring that one or more air conditioners runs constantly throughout a demand cooling phase, thereby attaining said desired temperature and concomitantly using the temperature differential to effect said specified variation in booth temperature.

2. An air conditioning system, including multiple air conditioners, for maintaining a desired temperature within specified tolerances and relative humidity in an air stream passing through a confined painting booth space, each of said multiple air conditioners supportive of a cooling coil set placed within the air stream and comprising:

a heater;

a first of said multiple air conditioners responsive to a first sensor that is situated in the air stream proximate an initial entry of the air stream to a ceiling plenum of the booth, said first sensor adapted to sense a first temperature;

at least a second of the multiple air conditioners responsive to a second sensor that is situated in the air stream, distal the first sensor, adapted to sense a second temperature to establish a temperature differential with respect to the first temperature; and a control means for electrically gating the heater and the multiple air conditioners to assure that one or more air conditioners runs constantly throughout a demand cooling phase and to sequence the multiple air conditioners and the heater, in a balancing of said temperature differential, so as to achieve said desired temperature within said specified tolerances.

3. A system for conditioning a space within a painting booth comprising a plurality of air conditioners, wherein at least two air conditioners of said plurality are responsive to corresponding distinct, set-apart temperature sensors and are operatively connected to at least one controller, wherein said at least one controller is a control means for switching and sequencing a heater and the at least two air conditioners to ensure that at least one of the air conditioners runs constantly throughout a demand cooling phase to thereby maintain in the space a desired temperature within specific limits.

\* \* \* \* \*